US011960337B2

(12) United States Patent
Feng et al.

(10) Patent No.: US 11,960,337 B2
(45) Date of Patent: Apr. 16, 2024

(54) CUSTOMIZED THERMAL AND POWER POLICIES IN COMPUTERS

(71) Applicant: Hewlett-Packard Development Company, L.P., Spring, TX (US)

(72) Inventors: Kang-Ning Feng, Taipei (TW); Yuan-Ti Chang, Taipei (TW); Reily Chang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 118 days.

(21) Appl. No.: 17/793,648

(22) PCT Filed: Jan. 22, 2020

(86) PCT No.: PCT/US2020/014567
§ 371 (c)(1),
(2) Date: Jul. 19, 2022

(87) PCT Pub. No.: WO2021/150219
PCT Pub. Date: Jul. 29, 2021

(65) Prior Publication Data
US 2023/0058713 A1  Feb. 23, 2023

(51) Int. Cl.
*G06F 9/4401* (2018.01)
*G06F 1/20* (2006.01)
*G06F 1/28* (2006.01)
*G06F 21/57* (2013.01)

(52) U.S. Cl.
CPC ............... *G06F 1/206* (2013.01); *G06F 1/28* (2013.01); *G06F 9/4406* (2013.01); *G06F 21/572* (2013.01); *G06F 2221/033* (2013.01)

(58) Field of Classification Search
CPC .................................... G06F 1/20; G06F 9/44
See application file for complete search history.

(56) References Cited

U.S. PATENT DOCUMENTS

| 7,210,048 | B2 * | 4/2007 | Bodas ..................... G06F 1/206 |
| | | | 713/340 |
| 7,506,190 | B2 * | 3/2009 | Thomas .................. G06F 1/206 |
| | | | 713/340 |
| 7,698,546 | B2 | 4/2010 | Stemen |

(Continued)

FOREIGN PATENT DOCUMENTS

EP   2607987 A1   6/2013

*Primary Examiner* — Phil K Nguyen
(74) *Attorney, Agent, or Firm* — Quarles & Brady LLP

(57) ABSTRACT

Example approaches for customization of thermal and power policies in computers, are described. In an example, a microcontroller of a computing system, also referred to as system, validates thermal policy custom data stored in a firmware storage medium of the system, in response to a supply of power to the system. On a successful validation of the thermal policy custom data, thermal control settings is updated with a customized thermal policy included in the thermal policy custom data. In response to initiation of a boot operation of the system, a processor of the system validates power policy custom data stored in the firmware storage medium. In response to a successful validation of the power policy custom data during the boot operation, the processor updates power control settings of the system with a customized power policy included in the power policy custom data.

15 Claims, 7 Drawing Sheets

(56) References Cited

U.S. PATENT DOCUMENTS

| | | | |
|---|---|---|---|
| 8,423,756 B2 | 4/2013 | Harmer | |
| 8,661,235 B2 | 2/2014 | Spottswood et al. | |
| 9,218,041 B2* | 12/2015 | Sur | G06F 1/3234 |
| 9,417,672 B2* | 8/2016 | Pamley | G06F 1/206 |
| 9,542,197 B2 | 1/2017 | Ali et al. | |
| 10,627,880 B2* | 4/2020 | Shabbir | F24F 11/30 |
| 2017/0344085 A1* | 11/2017 | Ragupathi | G05B 19/406 |
| 2023/0134324 A1* | 5/2023 | Emerson | G06F 21/602 |
| | | | 726/26 |
| 2023/0146736 A1* | 5/2023 | Vajravel | G06F 8/65 |
| | | | 717/168 |

\* cited by examiner

SYSTEM 100

MICROCONTROLLER 102
[[VALIDATE THERMAL POLICY CUSTOM DATA STORED IN A FIRMWARE STORAGE MEDIUM OF THE COMPUTING SYSTEM, IN RESPONSE TO SUPPLY OF POWER TO THE COMPUTING SYSTEM; AND

UPDATE THERMAL CONTROL SETTINGS OF THE COMPUTING SYSTEM WITH A CUSTOMIZED THERMAL POLICY INCLUDED IN THE THERMAL AND POWER POLICY CUSTOM DATA, IN RESPONSE TO THE THERMAL AND POWER POLICY CUSTOM DATA BEING SUCCESSFULLY VALIDATED]]

PROCESSOR 104

MEMORY 106
[[INITIATE A BOOT OPERATION OF THE COMPUTING SYSTEM BASED ON ONE OF A USER INPUT AND A WAKE UP SIGNAL;

VALIDATE POWER POLICY CUSTOM DATA STORED IN THE FIRMWARE STORAGE MEDIUM, DURING A FIRST INITIALIZATION PHASE OF THE BOOT OPERATION; AND

UPDATE POWER CONTROL SETTINGS OF THE COMPUTING SYSTEM WITH A CORRESPONDING CUSTOMIZED POWER POLICY ASSOCIATED WITH EACH OF THE FIRST INITIALIZATION PHASE AND A SECOND INITIALIZATION PHASE OF THE BOOT OPERATION, IN RESPONSE TO SUCCESSFUL VALIDATION OF THE POWER POLICY CUSTOM DATA DURING THE FIRST INITIALIZATION PHASE, WHEREIN THE CORRESPONDING CUSTOMIZED POWER POLICY IS INCLUDED IN THE POWER POLICY CUSTOM DATA]]

FIRMWARE STORAGE MEDIUM 108

Fig. 1

CUSTOMIZED THERMAL AND POWER POLICIES IN COMPUTERS

BACKGROUND

Computing systems include multiple internal components for executing different operations. The internal components of the computing system may operate at varying speeds, frequencies, and may perform different functions of varying degrees of complexity. These internal components are supplied with power through dedicated power control circuits or the supply of power is controlled through a motherboard circuit or a main circuit board of the computing system. The supply of power to the internal components is based on their respective power rating, speed, frequency of operation, duration of operation, etc. The computing systems thus include power policies for operation and control of these internal components. The power policies may include a defined set of rules for controlling supply of power to different internal components of the computing system for uninterrupted and error-free operations of those internal components.

Further, during operation, the internal components of the computing system may generate heat. Thus, the computing system includes cooling components, such as fans, to maintain the temperature of the internal components and the computing system within the rated boundaries. For example, a computing system may have a case mount fan, a power supply fan, a central processing unit (CPU) fan, and others to provide active cooling for the computing system. Other cooling components, such as pipes for flowing coolants, refrigeration devices, etc., may be used in addition to, or in place of, fans. The computing system includes thermal policies for controlling operation of the cooling components and thereby maintaining the temperature of the internal components of the computing system. The thermal policies may define rules for operation and control of the cooling components correlated to temperature measurements of the internal components.

BRIEF DESCRIPTION OF DRAWINGS

Example implementations are described with respect to the following figures.

FIG. 1 illustrates a computing system for customization of thermal and power policies, in accordance with an example.

DETAILED DESCRIPTION

Figure 2:
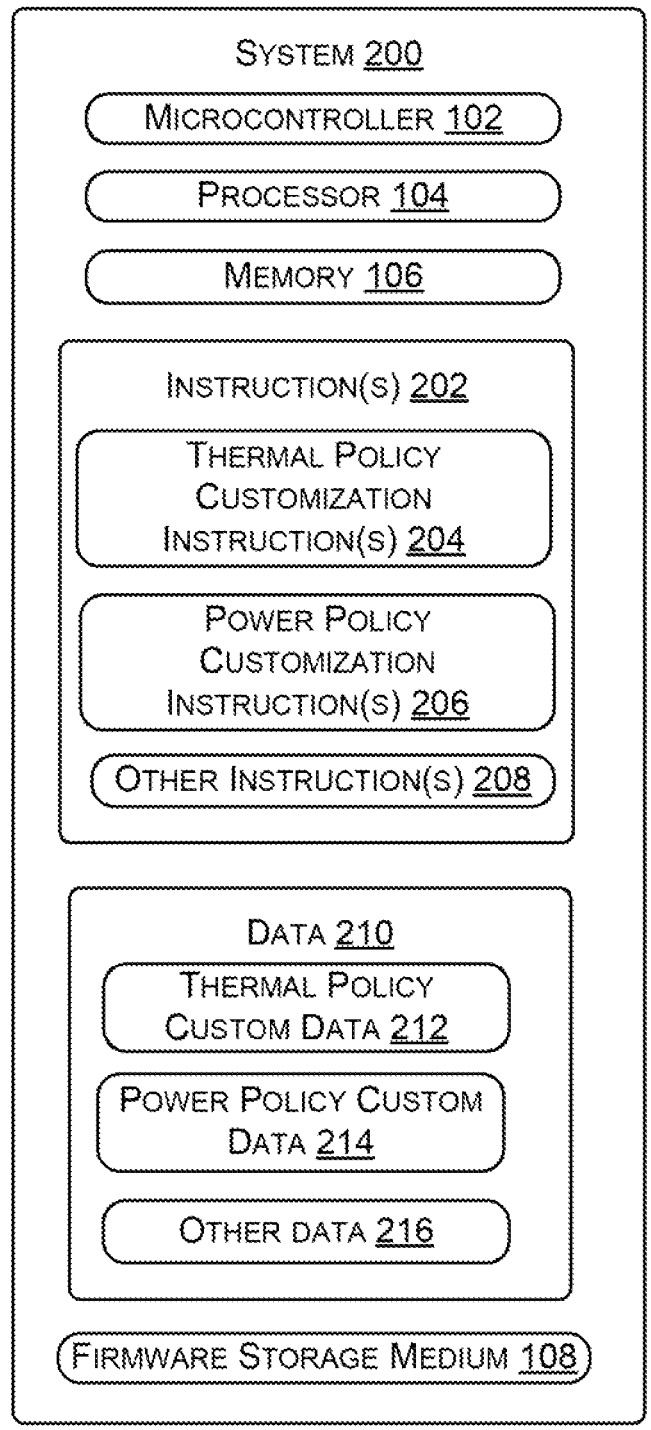
FIG. 2 illustrates a system for customization of thermal and power policies, in accordance with an example.

Default power policies of the computing system are generally integrated in system firmware, such as, Basic Input Output System (BIOS) or Unified Extensible Firmware interface (UEFI) of the computing system. In an example, the default power policies may be stored in a firmware storage medium, such as an Electrically Erasable Programmable Read-only-Memory (EEPROM) or a flash memory, associated with the system firmware. Thus, the default power policies are integrated with the system firmware. Further, default thermal policies are generally integrated with firmware of a microcontroller, such as Embedded Controller (EC) or Super Input Output (SIO) controller of the computing system. In an example, the microcontroller executes various system operations and on-board peripheral functions, including measuring of temperature, voltage, and fan speeds for temperature control, which the Operating System (OS) generally does not execute. The microcontroller may be perceived as a core system component, which is in an 'ON' state when power is supplied to the motherboard circuit of the computing system. The microcontroller can communicate with the OS or other applications of the computer system, by using Advanced Configuration and Power Interface (ACPI), System Management Bus (SM-Bus), Industry Standard Architecture (ISA) bus, Low Pin Count (LPC) bus, or shared memory. In an example, the microcontroller may include a dedicated Random-Access Memory (RAM), EEPROM, and flash memory on which the microcontroller's operating firmware is stored. In an example, the default thermal policies are stored in the firmware storage medium, such as an Electrically Erasable Programmable Read-only-Memory (EEPROM) or a flash memory, where the firmware of the microcontroller is stored.

The default thermal and power policies are generally set in a controlled environment of a laboratory. However, when a computing system is in operation at a customer site, in a real-world environment, temperature, humidity, etc. are different from the environmental conditions of the laboratory. So, the default thermal and power policies may not be able to effectively control thermal and power requirements of the internal components of the computing system.

Since the default thermal policies are integrated in the firmware associated with the microcontroller and the default power policies are integrated in the system firmware, customization of thermal and power policies based on customer requirements involves development, tuning, and validation of a firmware image build for each custom thermal and power policy corresponding to each customer requirement. This increases time and cost to deploy customized thermal and power policies. Further, the customized firmware image builds for each customer requirement is to be maintained by the firmware development team which increases the cost and human resource requirement for such deployments. Also, since the thermal and power policies are integrated into the firmware, every modification or update to the default power and thermal policies may involve a corresponding update to the firmware which may be complex, time consuming and may interrupt operation of other internal components. In addition, firmware updates involve chances of errors and the firmware may become corrupt due to presence of bugs in the update, firmware version mismatch, and power-interruption during the update process.

The present subject matter provides a flexible mechanism for customization of thermal and power policies multiple times without updating the firmware each time and without maintaining separate firmware image builds for different customer requirements and consequently enabling quick and effective customization of thermal and power policies.

The present subject matter describes customization of thermal and power policy in a computing system. In an example of the present subject matter, in response to a supply of power to the computing system, a microcontroller of the computing system validates thermal policy custom data stored in a firmware storage medium of the computing system. In an example, the microcontroller is a controller embedded in the main circuit board or motherboard circuit of the computing system. The microcontroller executes different on-board and peripheral functions. Examples of the microcontroller include an EC and a SIO. In an example, the firmware storage medium may be an EEPROM or flash memory dedicated for storing operating software of the microcontroller. In another example, the firmware storage medium may be an EEPROM or flash memory where system firmware, such as BIOS or UEFI is stored.

A sector or portion of the firmware storage medium may be designated for storing the thermal policy custom data and a power policy custom data. In an example, the thermal policy custom data may include data for operating a cooling component, such as a fan, of the computing system. In an example, the thermal policy custom data may include a customized thermal policy which is a set of rules, predefined based on customer requirements, for operating a cooling component, such as a fan, based on the set of rules. The customized thermal policy may include a customized fan curve that is indicative of a thermal control table specifying predefined fan speeds for specific temperature ranges of an internal component of the computing system. In an example, the power policy custom data may include a customized power policy which is a set of rules, predefined based on customer requirements, for operating an internal electronic component, such as a processor or controller or display, based on the set of rules. In an example, the customized power policy includes a set of rules for operation of a power control circuit of the computing system. The power control circuit may be electronic circuitry for supplying power to internal electronic components of the computing system.

In response to a successful validation of the thermal policy custom data, the microcontroller updates thermal control settings of the computing system with the customized thermal policy. Thus, the cooling components are operated as per the customer requirements, based on the customized thermal policy. In an example, the thermal control settings refer to configuration settings of the cooling component, such as a fan. In response to initiation of a boot operation of the computer system, the power policy custom data stored in the firmware storage medium is validated by a processor of the computing system. The boot operation refers to a sequence of operations performed by the computing system after a pre-boot sequence, such as Power on Self-Test (POST), of the computing system is completed. The POST refers to a diagnostic testing sequence performed by a firmware, such as the Basic Input Output System (BIOS) or Unified Extensible Firmware Interface (UEFI), to determine if the hardware of the computing system are working correctly. In response to a successful validation of the power policy custom data during the boot operation, the processor updates power control settings of the computing system with a customized power policy. In an example, the power control settings refer to configuration settings of internal electronic components, such as a display.

Thus, in the present subject matter, customized thermal and power policies may be updated multiple times based on customer requirements without updating the firmware. Since, updating of firmware is eliminated, separate firmware image builds for different customer requirements are no longer to be maintained, consequently reducing human resource requirement and costs. In an example, once, the customized thermal and power policies are updated, the default thermal and power policies may be overridden.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a computing system 100 for customization of thermal and power policies, in accordance with an example. In some examples, the computing system 100, also referred to as system 100, may be a computer, a laptop, a handheld device, or the like. The system 100 includes a microcontroller 102. In an example, the microcontroller 102 executes various system operations and on-board peripheral functions, including measuring of temperature, voltage, and fan speeds for temperature control, which the Operating System (OS) generally does not execute. The microcontroller 102 may be perceived as a core system component, which is in an 'ON' state when power is supplied to the motherboard circuit of the computing system. The microcontroller 102 can communicate with the OS or other applications of the computer system 100, by using Advanced Configuration and Power Interface (ACPI), System Management Bus (SMBus), Industry Standard Architecture (ISA) bus, Low Pin Count (LPC) bus, or shared memory. In an example, the microcontroller 102 may include a dedicated storage medium (not shown), such as, a RAM, an EEPROM, or a flash memory on which the microcontroller's operating firmware is stored. Examples of the microcontroller 102 include an Embedded Controller (EC) and a Super Input Output Controller (SIO). In an example, the dedicated storage medium of the microcontroller 102 stores instructions executable by the microcontroller 102.

As shown in FIG. 1, the system 100 includes a processor 104 and a memory 106. The processor 104 may include a microprocessor, a processor module or subsystem, a programmable integrated circuit, a programmable gate array, multiple processors, a microprocessor including multiple processing cores, or another control or computing device. The memory 106 stores instructions executable by the processor 104. The memory 106 may include any computer-readable medium known in the art including, for example, volatile memory (e.g., RAM), and/or non-volatile memory (e.g., EPROM, flash memory, etc.). Further, in an example, the system 100 may include interfaces (not shown), such as a network interface that provides connectivity to a communication network, such as an Ethernet network, a local wireless network, a cellular telephone network, and so forth.

As shown in FIG. 1, the system 100 includes a firmware storage medium 108. The firmware storage medium 108 is a non-volatile memory that stores firmware of the system 100. In an example, the firmware storage medium 108 may store BIOS or UEFI firmware. In another example, the firmware storage medium 108 may store firmware for operating an EC or a SIO. Examples of the firmware storage medium include an EEPROM and a flash memory. In an example thermal and power policies may be stored in the firmware storage medium 108. Although in FIG. 1, the firmware storage medium 108 is shown to be separate from the memory 106, in an example, a portion of the memory 106 may also be designated as a firmware storage medium 108.

In an example, thermal policy custom data and power policy custom data may be stored in a sector or portion of the firmware storage medium 108. The thermal policy custom data includes a customized thermal policy and digital signatures for authentication and compatibility verification.

The customized thermal policy is a set of rules, predefined based on customer requirements, for operating a cooling component, such as a fan, of the system 100 based on the set of rules. The power policy custom data includes a customized power policy and digital signatures for authentication and compatibility verification. The customized power policy includes a set of rules for operation of a power control circuit (not shown) of the computing system 100.

In an example, electrical power may be supplied to the system 100 by establishing an electrical connection for supplying power to a main circuit board or motherboard circuit of the system 100. In another example, electrical power may be supplied to the system 100 on restoration of the supply of power after a hard shutdown of the system 100. A hard shutdown refers to shutting down of the system 100 due to interruption of power or power disconnects. In response to a supply of power to the system 100, the thermal policy custom data stored in the firmware storage medium 108 is validated by the microcontroller 102. In response to successful validation of the thermal policy custom data, thermal control settings of the system 100 is updated with the customized thermal policy included in the thermal policy custom data. In an example, the thermal control settings refer to configuration settings of a cooling component, such as a fan, of the system 100.

Further, the instructions stored in the memory 106, when executed by the processor 104, causes the processor 104 to initiate a boot operation of the computing system based on one of a user input and a wake up signal. In an example, the user input includes actuation of a power button integrated in the system 100 and the wake-up signal includes a Wake-on-LAN message received by the system 100 from a remote device. The boot operation refers a sequence of operations performed by the system 100 after a pre-boot sequence, such as Power on Self-Test (POST), of the system 100 is completed. In an example the boot operation includes initialization phases. An initialization phase is a stage of the boot operation during which a Root of Trust (RoT) of the system 100 is established and operability of hardware, software, or firmware components of the system 100 are checked before making the hardware, software or firmware components available during runtime. RoT is a set of functions in a computing module or instruction set that is always trusted by the computer's operating system (OS). The RoT serves as a separate compute engine controlling the trusted computing platform cryptographic processor on the computer. The boot operation may include more than one initialization phases. Examples of the initialization phases include a Pre-Extensible Firmware Interface (EFI) Initialization (PEI) phase and a Driver Execution Environment (DXE) phase.

In response to initiation of the boot operation, the instructions stored in the memory 106, when executed by the processor 104 causes the processor 104 to validate the power policy custom data stored in the firmware storage medium 108, during a first initialization phase of the boot operation. In an example the first initialization phase is the PEI phase. In response to successful validation of the power policy custom data during the first initialization phase, the instructions stored in the memory 106, when executed by the processor 104 causes the processor 104 to update power control settings of the computing system with a corresponding customized power policy associated with each of the first initialization phase and a second initialization phase of the boot operation. In an example, the second initialization phase is a DXE phase. In an example, the customized power policy corresponding to each of the first initialization phase and the second initialization phase is included in the power policy custom data. In an example, the power control settings refer to configuration settings of internal electronic components, such as a display, a controller, etc. Thus, in the present subject matter thermal and power policies may be customized multiple times without updating the firmware of the system 100 and without maintaining multiple firmware image builds for each customized thermal and power policy. These and other aspects of the present subject matter are described in detail with reference to FIG. 2.

FIG. 2 illustrates a system 200 for customization of thermal and power policies, in accordance with an example. Examples of the system 200 include a computer, a laptop, and a handheld device. As shown in FIG. 2, the system 200 includes the microcontroller 102, the processor 104 coupled to the memory 106, and the firmware storage medium 108. The processor 104 may be implemented as microprocessors, microcomputers, digital signal processors, central processing units, state machines, logic circuitries, and any devices that manipulate signals based on operational instructions. Among other capabilities, the processor 104 is configured to fetch and execute computer-readable instructions stored in the memory 106. The computer-readable instructions, also referred to as instructions, includes instructions 202. The instructions 202 may include routines, programs, components, applications, data structures, and the like, which perform particular tasks or implement particular abstract data types. The instructions, being executable by the processor(s), may also be referred to as processor-executable instructions. The execution of the instructions to perform a function may be interchangeably referred to as the instructions causing performance of the function or the instructions enabling performance of the function.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and custom, may also be included.

The memory 106 may include any computer-readable medium known in the art including, for example, volatile memory (e.g., RAM), and/or non-volatile memory (e.g., EPROM, flash memory, etc.). The instruction(s) 202 include thermal policy customization instruction(s) 204 which corresponds to instructions stored on a computer-readable medium and executable by a microcontroller, such as the microcontroller 102, to update thermal control settings of the system 200, and power policy customization instructions which corresponds to instructions stored on a computer-readable medium and executable by a processor, such as the processor 104, to update power control settings of the system 200. The instruction(s) 202 also comprise other instruction(s) 208 that supplement operations of an operating system and other applications on the system 200. Although the instructions 202 are illustrated separately in FIG. 2, in an example, the instructions 202, or a portion thereof, may be stored in the memory 106. In another example, the instructions 202, or a portion thereof, may be stored in the firmware storage medium 108 or in a non-volatile memory (not shown), such as EEPROM or flash memory of the microcontroller 102.

Data 210 serves, amongst other things, as a repository for storing data that may be fetched, processed, received, or generated by the instruction(s) 202. The data 210 includes thermal policy custom data 212 and power policy custom data 214. In an example, the thermal policy custom data 212 and the power policy custom data 214 may be stored in a sector or portion of the firmware storage medium 108. The thermal policy custom data 212 includes a customized thermal policy and digital signatures for authentication and compatibility verification. The customized thermal policy is a set of rules, predefined based on customer requirements, for operating a cooling component, such as a fan, of the system 200 based on the set of rules. In an example, the customized thermal policy includes a customized fan curve to control the temperature of an internal component of the system 200. The customized fan curve is indicative of a thermal control table specifying predefined fan speeds for specific temperature ranges of the internal component. In an example, the power policy custom data 214 may include a customized power policy which is a set of rules, predefined based on customer requirements, for operating an internal electronic component, such as a processor or controller or display, based on the set of rules. In an example, the customized power policy includes a set of rules for operation of a power control circuit of the computing system. The power control circuit may be electronic circuitry for supplying power to internal electronic components of the computing system. The data 220 also comprises other data 216 that may be fetched, processed, received, or generated during execution of other instruction(s) 208.

In an example, a user may request for an update of the thermal and power policy by providing a user input to generate a user request. In an example, the instructions 202 when executed by the processor 104, may cause the processor 104 to generate the user request and transmit the user request to a server device, such as a datacenter. In response, the thermal policy custom data 212 and the power policy custom data 214 may be received by the system 200. In an example, the received thermal policy custom data and the power policy custom data is authenticated based on predefined digital signatures. In response to successful authentication of the thermal policy custom data 212 and the power policy custom data 214, the thermal policy custom data 212 and the power policy custom data 214 is stored in a predefined memory location of the firmware storage medium 108.

In operation, consider that power is supplied to the system 200. In an example, electrical power may be supplied to the system 200 by establishing an electrical connection for supplying power to a main circuit board or motherboard circuit (not shown) of the system 200. In another example, electrical power may be supplied to the system 200 on restoration of the supply of power after a hard shutdown of the system 200. A hard shutdown refers to shutting down of the system 200 due to interruption of power or power disconnects. In response to a supply of power to the system 200, the microcontroller 102 starts up. In an example, start-up of the microcontroller 102 refers to initiation of a start-up sequence which includes a series of operations performed by an EC or SIO based on a firmware of the EC or SIO, in response to a supply of power to the system 200.

In an example, the microcontroller 102 may search the firmware storage medium 108 and load a firmware of the microcontroller 102 and a default thermal policy. In an example, the default thermal policy may be integrated to the firmware of the microcontroller 102 and may be stored in the firmware storage medium 108. In an example, the default thermal policy may include a default fan curve indicative of a default thermal control table specifying predefined fan speeds for specific temperature ranges of an internal component, such as a processor or display.

The thermal policy customization instruction(s) 204, when executed by the microcontroller 102, cause the microcontroller 102 to search the thermal policy custom data 212 in a predefined memory location of the firmware storage medium 108. The predefined memory location may be a memory address pointing to a memory block or sector of the firmware storage medium 108. Further, the thermal policy customization instruction(s) 204 may enable authentication of the thermal policy custom data 212 stored in the predefined location based on a digital signature. In an example, the digital signature may be embedded in the thermal policy custom data and may indicate that the thermal policy custom data 212 is valid. In response to successful authentication of the thermal policy custom data 212, thermal policy customization instruction(s) 204 causes verification of compatibility of the thermal policy custom data 212 with a motherboard circuit and Input Output System (IOS) firmware of the system 200. In an example, a Hardware ID of the motherboard circuit and a version number of a BIOS/UEFI firmware is checked for verification of compatibility. Successful authentication and verification of compatibility of the thermal policy custom data 212 indicates successful validation of the thermal policy custom data 212.

In response to successful validation of the thermal policy custom data 212, the customized fan curve is loaded by the microcontroller 102 for operation of a fan or other cooling component of the system 200. The fan may be operated to control the temperature of an internal component, such as a memory chip, a processor, etc., of the system 200. In an example, more than one customized fan curve may be loaded for operation of multiple fans or other cooling components. Loading the customized fan curve refers to updating the thermal control settings of the system 200 with the customized thermal policy included in the thermal policy custom data 212.

In response to a failure in validation of the thermal policy custom data 212, the thermal policy customization instruction(s) 204, when executed by the microcontroller 102, cause the microcontroller 102 to load the default thermal policy and continue operation of the cooling components of the system 200 based on the default thermal policy. Thus, the thermal control settings of the system 200 are configured based on either the customized thermal policy or the default thermal policy. In an example, once the thermal control settings of the system 200 is updated with one of the customized thermal policy and the default thermal policy, the microcontroller 102, such as an EC or SIO, completes remaining operations of the start-up sequence and waits for initiation of a boot operation of the system 200. The boot operation refers to a sequence of operations performed by the system 200 after a pre-boot sequence, such as Power on Self-Test (POST), of the system 200 is completed. In an example the boot operation includes initialization phases. An initialization phase is a stage of the boot operation during which a Root of Trust (RoT) of the system 200 is established and operability of hardware, software, or firmware components of the system 200 are checked before making the hardware, software or firmware components available during runtime. RoT is a set of functions in a computing module or instruction set that is always trusted by the computer's operating system (OS). The RoT serves as a separate compute engine controlling the trusted computing platform cryptographic processor on the computer. The boot operation may include more than one initialization phases. Examples of the initialization phases include a Security (SEC) phase, a Pre-EFI (PEI) initialization phase, and a Driver Execution phase (DXE) initialization phase.

In an example, the SEC phase is a stage of the UEFI-based boot operation. In the SEC phase temporary memory, such as CPU cache as Random-Access Memory, is initiated which serves as the system's software RoT. In an example, the PEI phase is a stage of UEFI-based boot operation after the SEC phase and includes computer readable instructions to handle early hardware initialization tasks such as memory initialization and recovery operations. Additionally, in the PEI phase the current boot mode discovery may be performed. In case the system 200 resumes from a sleeping state, during the PEI phase, hardware registers may be restored to a pre-sleep state. In an example, the DXE phase corresponds to a stage of the UEFI boot operation after the PEI phase. In an example, during the DXE phase hardware drivers, feature code, Peripheral Component Interconnect (PCI) bus, and runtime services for transfer of the control of the system 200 from the firmware to the Operating System (OS) are initialized. In an example, a customized power policy may be associated with each of the initialization phases. In an example, the PEI phase and the DXE phase may have a corresponding customized power policy associated with each. The customized power policy associated with the PEI phase may enable configuration of power settings in components, such as memory, of the system 200 which are initialized during the PEI phase. The customized power policy associated with the DXE phase may enable configuration of power settings in components, such as PCI bus, hardware drivers, etc., of the system 200 which are initialized during the DXE phase.

In an example, the boot operation may be initiated based on one of a user input and a wake-up signal. In an example, the user input includes actuation of a power button integrated in the system 200 and the wake-up signal includes a Wake-on-LAN message received by the system 200 from a remote device. In response to initiation of the boot operation, a system firmware, such as BIOS/UEFI initiates an initialization phase among multiple initialization phases of the boot operation. In an example, the SEC phase is initiated.

In response to completion of the SEC phase, a PEI phase is initialized. In the PEI phase, the power policy customization instructions 206, when executed by the processor 104, may cause the processor 104 to search for the power policy custom data 214 in a predefined memory location of the firmware storage medium 108. The predefined memory location may be a memory address pointing to a memory block or sector of the firmware storage medium 108. Further, the power policy customization instruction(s) 206 may enable authentication of the power policy custom data 214 stored in the predefined location based on a digital signature. In an example, the digital signature may be embedded in the power policy custom data and may indicate that the power policy custom data 214 is valid. In response to successful authentication of the power policy custom data 214, power policy customization instruction(s) 206 causes verification of compatibility of the power policy custom data with a motherboard circuit and Input Output System (IOS) firmware of the system 200. In an example, a Hardware ID of the motherboard circuit and a version number of a BIOS/UEFI is checked for verification of compatibility. Successful authentication and verification of compatibility of the power policy custom data 214 indicates successful validation of the power policy custom data 214.

In response to successful validation of the power policy custom data 214 during the PEI phase, the power policy customization instructions 206 may cause allocation of a predefined sector of the memory 106 of the system 200 for storing the power policy custom data 216. Further, the power policy customization instructions 206 may cause creation of a copy of the power policy custom data 214 to be stored in the predefined sector of the memory. In an example, a memory block, such as a hand-off block (HoB) of the memory 106 is created, where the copy of the power policy custom data 216 is stored.

The power policy customization instructions 206 when executed by the processor 104, may further cause the processor 104, to load configuration information in the processor 104, a chipset (not shown), and the microcontroller 102 for operation of the power control circuit (not shown) of the system 200, based on the customized power policy associated with the PEI phase. The configuration information includes power related settings in different components for control and operation of different power control circuits in the system 200. Subsequently, other operations of the PEI phase are executed.

In response to completion of the PEI phase, the DXE phase of the boot operation is initiated. In the DXE phase, the power policy customization instructions 206 may cause the processor 104 to verify whether the power policy custom data 214 or a copy thereof is present in the predefined sector of the memory 106, such as the HoB. In response to successful verification of the presence of the power policy custom data 214 in the predefined sector of the memory 106, the power policy customization instructions 206 enable loading configuration information in the processor 104, the chipset, and the microcontroller 102 for operation of the power control circuit based on the customized power policy associated with the DXE phase.

In response to failure in validation of the power policy custom data 214 during the PEI phase, or, in response to failure in verification of presence of the power policy custom data 214 or a copy thereof in the HoB, a default power policy associated with an initialization phase of the boot operation may be loaded. In an example, during the PEI phase of the boot operation a default power policy associated with the PEI phase may be loaded. In another example, during the DXE phase of the boot operation a default power policy associated with the DXE phase may be loaded. On completion of the operations of the DXE phase, the processor 104 may handoff control of the system 200 to the OS and runtime may be initiated.

Figure 3:
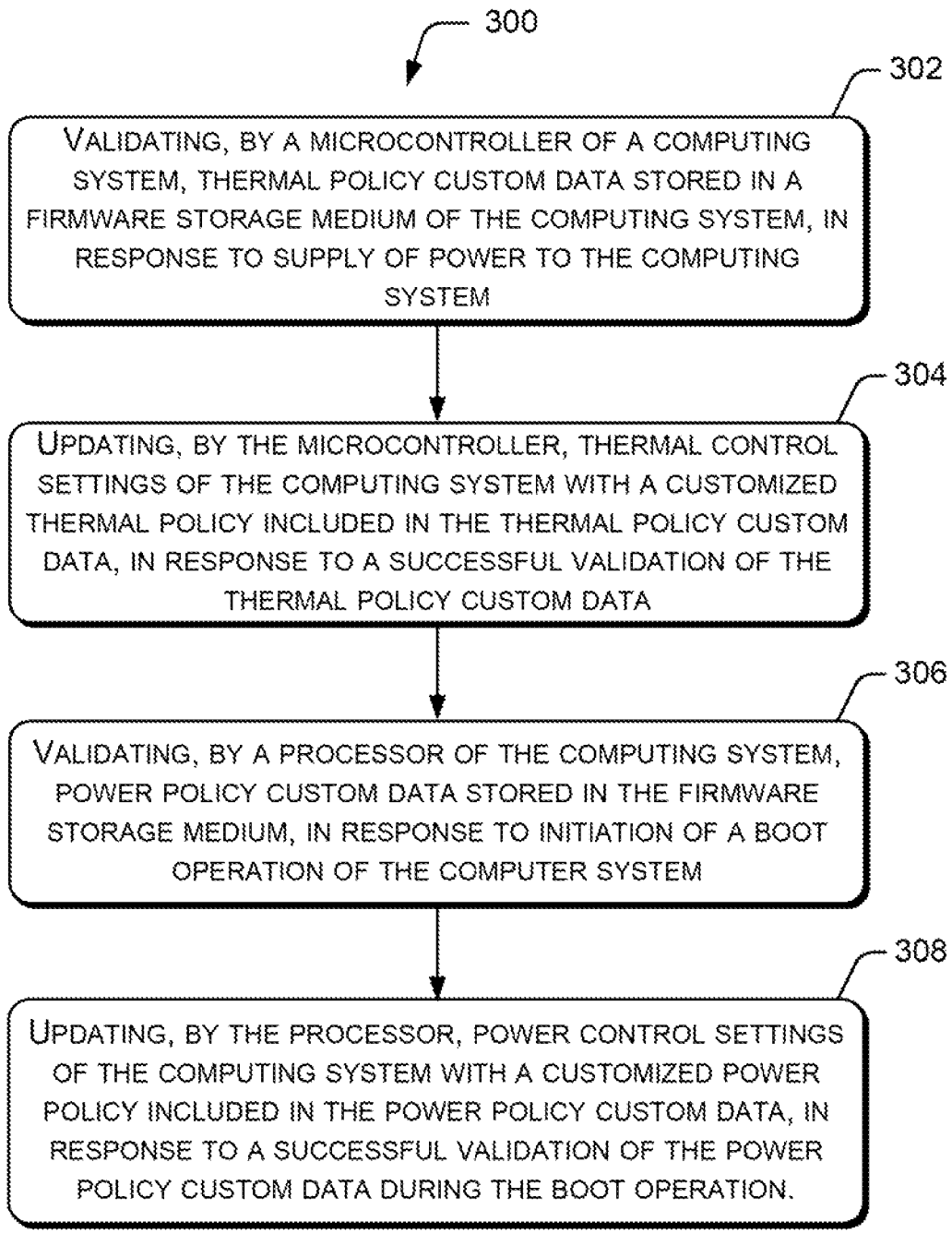
FIG. 3 illustrates a method for customization of thermal and power policies, in accordance with an example.

FIG. 3 illustrates a method 300 for customization of thermal and power policies, in accordance with an example. The method 300 can be implemented by processing resource (s) or computing device(s) through any suitable hardware, a non-transitory machine readable medium, or combination thereof. In an example, step(s) of the method 300 may be performed by execution of computer-readable instructions, such as the thermal policy customization instruction(s) 204 and the power policy customization instruction(s) 206 which includes instructions stored on a medium and executable by a processing resource, such as the microcontroller 102 and the processor 104, of a computing system, such as the system 100 or 200. Further, although the method 300 is described in context of the aforementioned system 100 or 200, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, in response to a supply of power to the system, such as the system 100 or 200, thermal policy custom data, such as the thermal policy custom data 212, stored in a firmware storage medium, such as the firmware storage medium 108, is validated by a microcontroller, such as the microcontroller 102. In an example, power is supplied to the system by establishing an electrical connection to the main circuit board or motherboard of the system. At block 304, in response to successful validation of the thermal policy custom data, thermal control settings of the system is updated with a customized thermal policy included in the thermal policy custom data. In an example, the customized thermal policy is a set of rules, predefined based on customer requirements, for operating a cooling component, such as a fan, based on the set of rules. The customized thermal policy may include a customized fan curve that is indicative of a thermal control table specifying predefined fan speeds for specific temperature ranges of an internal component of the computing system. In an example, the thermal control settings refer to configuration settings of a cooling component, such as a fan, of the system.

Further, once a boot operation of the system is initiated based on one of a user input and a wake up signal, a power policy custom data, such as the power policy custom data 214, stored in the firmware storage medium, such as the firmware storage medium 108, is validated during the boot operation, at block 306. In an example, the power policy custom data may be validated during a PEI initialization phase of the boot operation. In response to successful validation of the power policy custom data during the boot operation, power control settings of the system are updated with customized power policy included in the power policy custom data, at block 308. Thus, in the present subject matter thermal and power policies may be customized without updating the firmware of the system each time of an update and without maintaining multiple firmware image builds for each customized thermal and power policy.

Figure 4A:
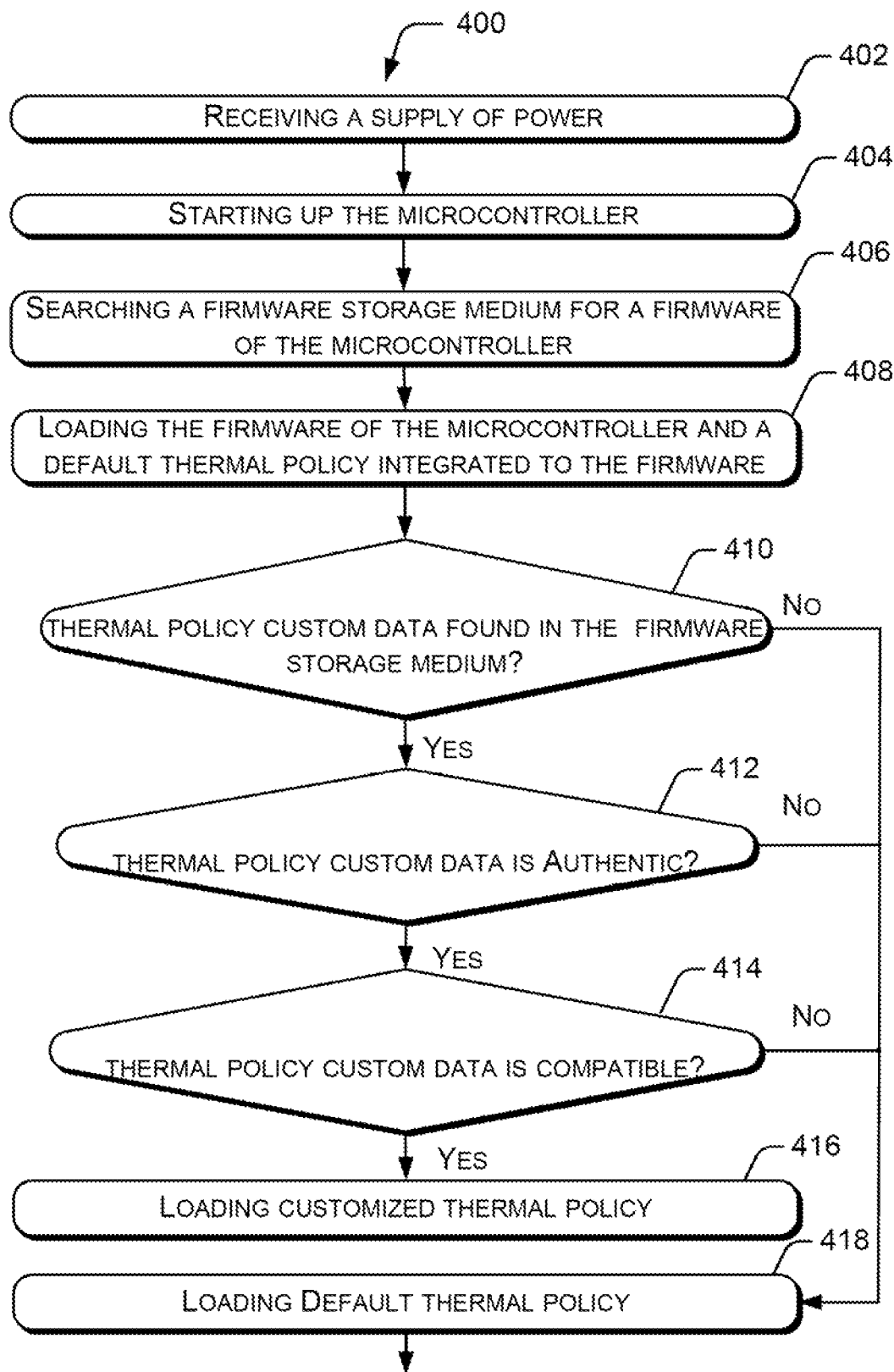
FIGS. 4A, 4B, and 4C illustrate a method for customization of thermal and power policies, in accordance with an example.
Figure 4B:
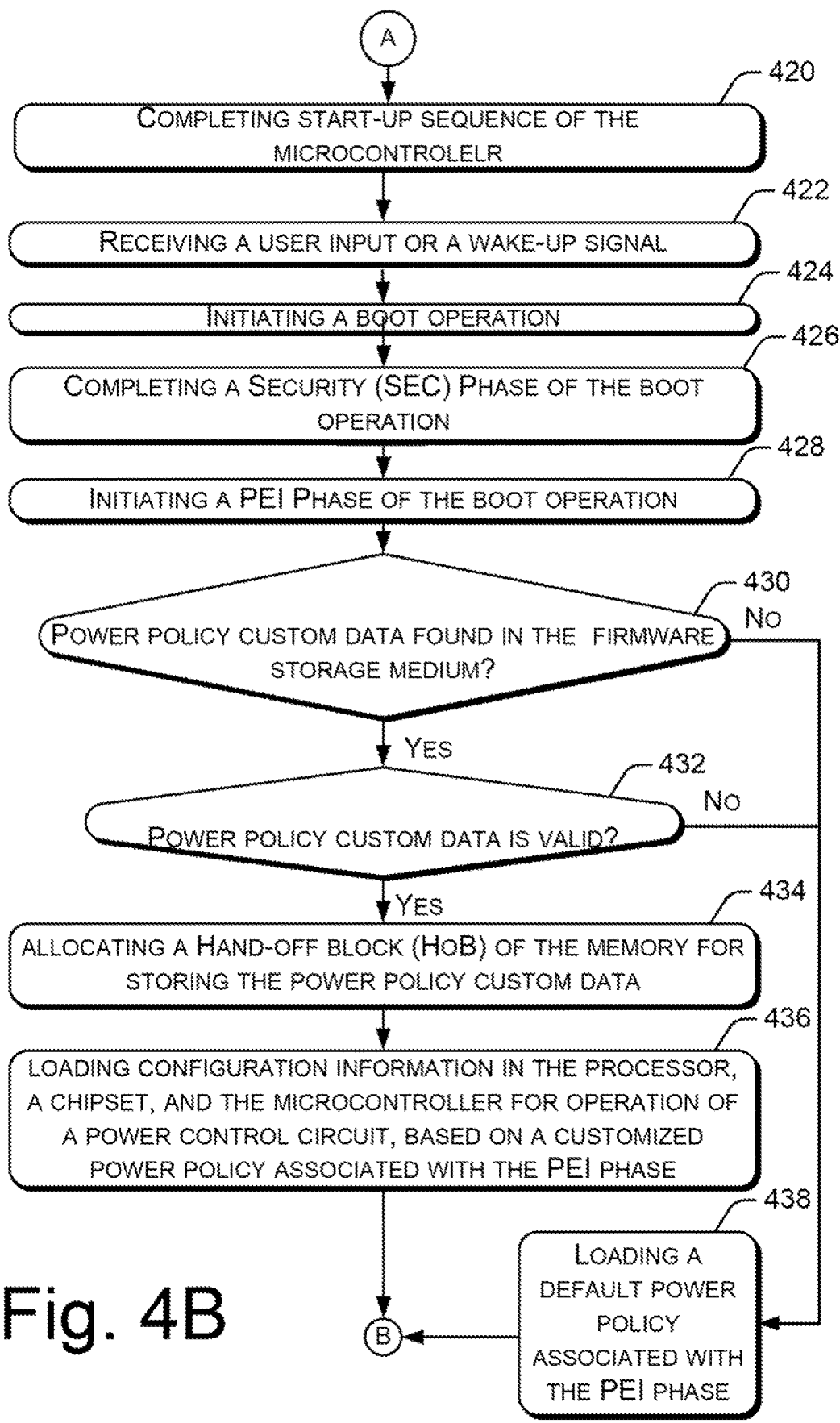
Figure 4C:
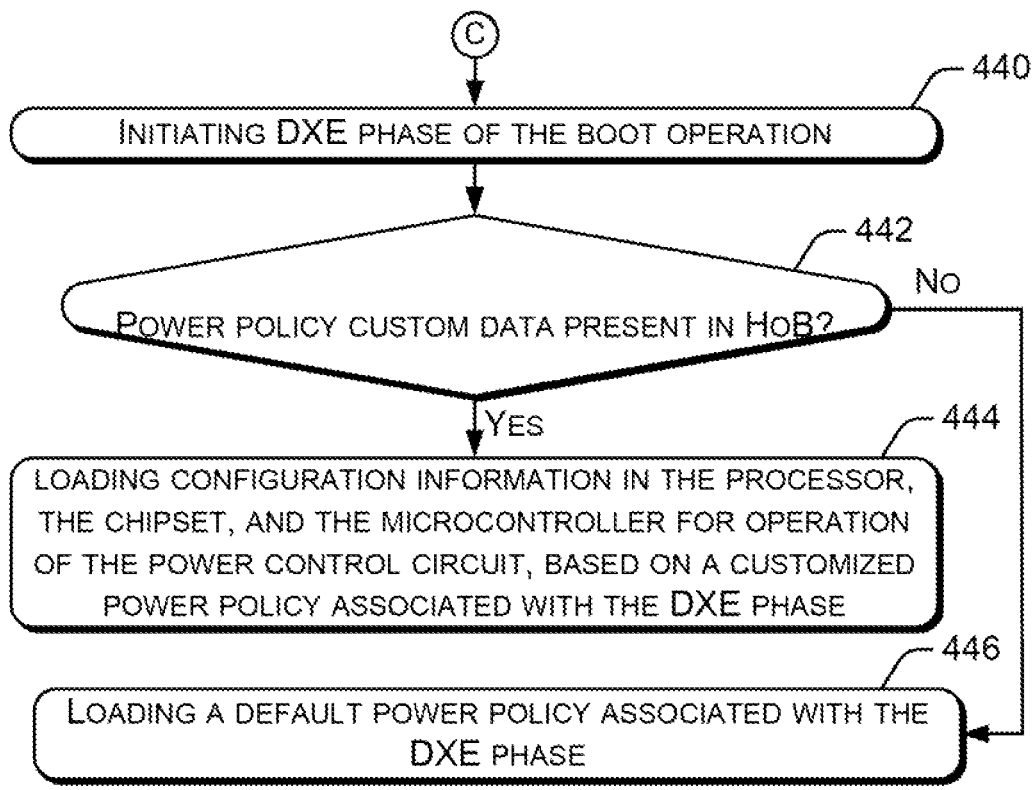

FIGS. 4A, 4B, and 4C illustrate a method 400 for customization of thermal and power policies, in accordance with an example. The method 400 can be implemented by processing resource(s) or computing device(s) through any suitable hardware, a non-transitory machine readable medium, or combination thereof. In an example, step(s) of the method 400 may be performed by execution of computer-readable instructions, such as the thermal policy customization instruction(s) 204 and the power policy customization instruction(s) 206 which include instructions stored on a medium and executable by a processing resource, such as the microcontroller 102 and the processor 104, of a system, such as the system 100 or 200. Further, although the method 400 is described in context of the aforementioned system 100 or 200, other suitable systems may be used for execution of the method 400. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Consider that power is supplied to a system, such as the system 100 or 200. In an example, electrical power may be supplied to the system by establishing an electrical connection for supplying power to a main circuit board or motherboard circuit (not shown) of the system. At block 402, the system receives the supply of power. In response to supply of power to the system, a microcontroller, such as the microcontroller 102, starts up, at block 404. In an example, start-up of the microcontroller refers to initiation of a start-up sequence which includes a series of operations performed by an EC or SIO based on a firmware of the EC or SIO. At block 406, the microcontroller may search a firmware storage medium, such as the firmware storage medium 108, for a firmware of the microcontroller. and load a firmware of the microcontroller 102 and a default thermal policy. At block 408, the firmware of the microcontroller and a default thermal policy integrated to the firmware of the microcontroller is loaded. In an example, the default thermal policy may include a default fan curve indicative of a default thermal control table specifying predefined fan speeds for specific temperature ranges of an internal component, such as a processor or display.

At block 410, the microcontroller searches the firmware storage medium for thermal policy custom data, such as the thermal policy custom data 212, in a predefined memory location of the firmware storage medium. The predefined memory location may be a memory address pointing to a memory block or sector of the firmware storage medium. If the thermal policy custom data is found in the firmware storage medium (YES' branch from block 410), authentication of the thermal policy custom data is performed based on a digital signature, at block 412. In an example, the digital signature may be embedded in the thermal policy custom data and may indicate that the thermal policy custom data is valid. In response to successful authentication of the thermal policy custom data, compatibility of the thermal policy custom data with a motherboard circuit and Input Output System (IOS) firmware of the system is verified, at block 414. In an example, a Hardware ID of the motherboard circuit and a version number of a BIOS/UEFI firmware is checked for verification of compatibility. Successful authentication and verification of compatibility of the thermal policy custom data indicates successful validation of the thermal policy custom data.

In response to successful validation of the thermal policy custom data (YES' branch from block 414), power control settings of the system is updated with a customized thermal policy included in the thermal policy custom data. In an example, a customized fan curve, included in the customized thermal policy is loaded by the microcontroller for operation of a fan or other cooling component of the system.

In response to a failure in validation of the thermal policy custom data ('No' branches from blocks 410, 412, and 414), the default thermal policy is loaded and operation of the cooling components of the system is continued based on the default thermal policy. Thus, the thermal control settings of the system are configured based on either the customized thermal policy or the default thermal policy.

In an example, once the thermal control settings of the system is updated with one of the customized thermal policy and the default thermal policy, the microcontroller, such as an EC or SIO, completes remaining operations of the start-up sequence, at block 420, and waits for initiation of a boot operation of the system. The boot operation refers to a sequence of operations performed by the system after a pre-boot sequence, such as Power on Self-Test (POST), of the system is completed.

In an example the boot operation includes initialization phases. An initialization phase is a stage of the boot operation during which a Root of Trust (RoT) of the system is established and operability of hardware, software, or firmware components of the system are checked before making the hardware, software or firmware components available during runtime. RoT is a set of functions in a computing module or instruction set that is always trusted by the computer's operating system (OS). The RoT serves as a separate compute engine controlling the trusted computing platform cryptographic processor on the computer. The boot operation may include more than one initialization phases. Examples of the initialization phases include a Security (SEC) phase, a Pre-EFI (PEI) initialization phase, and a Driver Execution phase (DXE) initialization phase.

In an example, the SEC phase is a stage of the UEFI-based boot operation. In the SEC phase temporary memory, such as CPU cache as Random-Access Memory, is initiated which serves as the system's software RoT. In an example, the PEI phase is a stage of UEFI-based boot operation after the SEC phase and includes computer readable instructions to handle early hardware initialization tasks such as memory initialization and recovery operations. Additionally, in the PEI phase the current boot mode discovery may be performed. In case the system resumes from a sleeping state, during the PEI phase, hardware registers may be restored to a pre-sleep state. In an example, the DXE phase corresponds to a stage of the UEFI boot operation after the PEI phase. In an example, during the DXE phase hardware drivers, feature code, Peripheral Component Interconnect (PCI) bus, and runtime services for transfer of the control of the system from the firmware to the Operating System (OS) are initialized. In an example, a customized power policy may be associated with each of the initialization phases. In an example, the PEI phase and the DXE phase may have a corresponding customized power policy associated with each. The customized power policy associated with the PEI phase may enable configuration of power settings in components, such as memory, of the system which are initialized during the PEI phase. The customized power policy associated with the DXE phase may enable configuration of power settings in components, such as PCI bus, hardware drivers, etc., of the system which are initialized during the DXE phase.

At block 422, one of a user input and a wake-up signal is received. In an example, the user input includes actuation of a power button integrated in the system and the wake-up signal includes a Wake-on-LAN message received by the system from a remote device. At block 424, the boot operation is initiated based on one of the user input and the wake-up signal received. In response to initiation of the boot operation, a system firmware, such as BIOS/UEFI initiates an initialization phase among multiple initialization phases of the boot operation. In an example, the SEC phase is initiated. At block 426, the SEC phase of the boot operation is completed.

In response to completion of the SEC phase, a PEI phase is initialized, at block 428. In the PEI phase, the power policy custom data is searched in a predefined memory location of the firmware storage medium, at block 430. In response to the power policy custom data being found in the firmware storage medium (YES' branch from block 430), the power policy custom data is authenticated based on a digital signature, at block 432. In an example, the digital signature may be embedded in the power policy custom data and may indicate that the power policy custom data is valid. In an example, compatibility of the power policy custom data is verified with a motherboard circuit and Input Output System (IOS) firmware of the system. Successful authentication and verification of compatibility of the power policy custom data indicates successful validation of the power policy custom data (YES' branch from block 432).

In response to successful validation of the power policy custom data during the PEI phase, a predefined sector of the memory, such as a hand-off block (HoB), may be allocated for storing the power policy custom data, at block 434. At block 436, configuration information is loaded in the processor, a chipset, and the microcontroller for operation of a power control circuit of the system, based on the customized power policy associated with the PEI phase. The configuration information includes power related settings in different components for control and operation of different power control circuits in the system. Subsequently, other operations of the PEI phase are executed. In response to failure in validation of the power policy custom data during the PEI phase, a default power policy associated with the PEI phase of the boot operation is loaded, at block 438.

In response to completion of the PEI phase, the DXE phase of the boot operation is initiated, at block 440. In the DXE phase, it is verified whether the power policy custom data is present in the predefined sector of the memory 106, such as the HoB, at block 442. In response to successful verification of the presence of the power policy custom data in the HoB (YES' branch from block 442), configuration information is loaded in the processor, the chipset, and the microcontroller for operation of the power control circuit based on the customized power policy associated with the DXE phase, at block 444. In response to failure in verification of presence of the power policy custom data in the HoB, a default power policy associated with the DXE phase of the boot operation is loaded, at block 446. On completion of the operations of the DXE phase, the processor 104 may handoff control of the system to the OS and runtime may be initiated.

Figure 5:
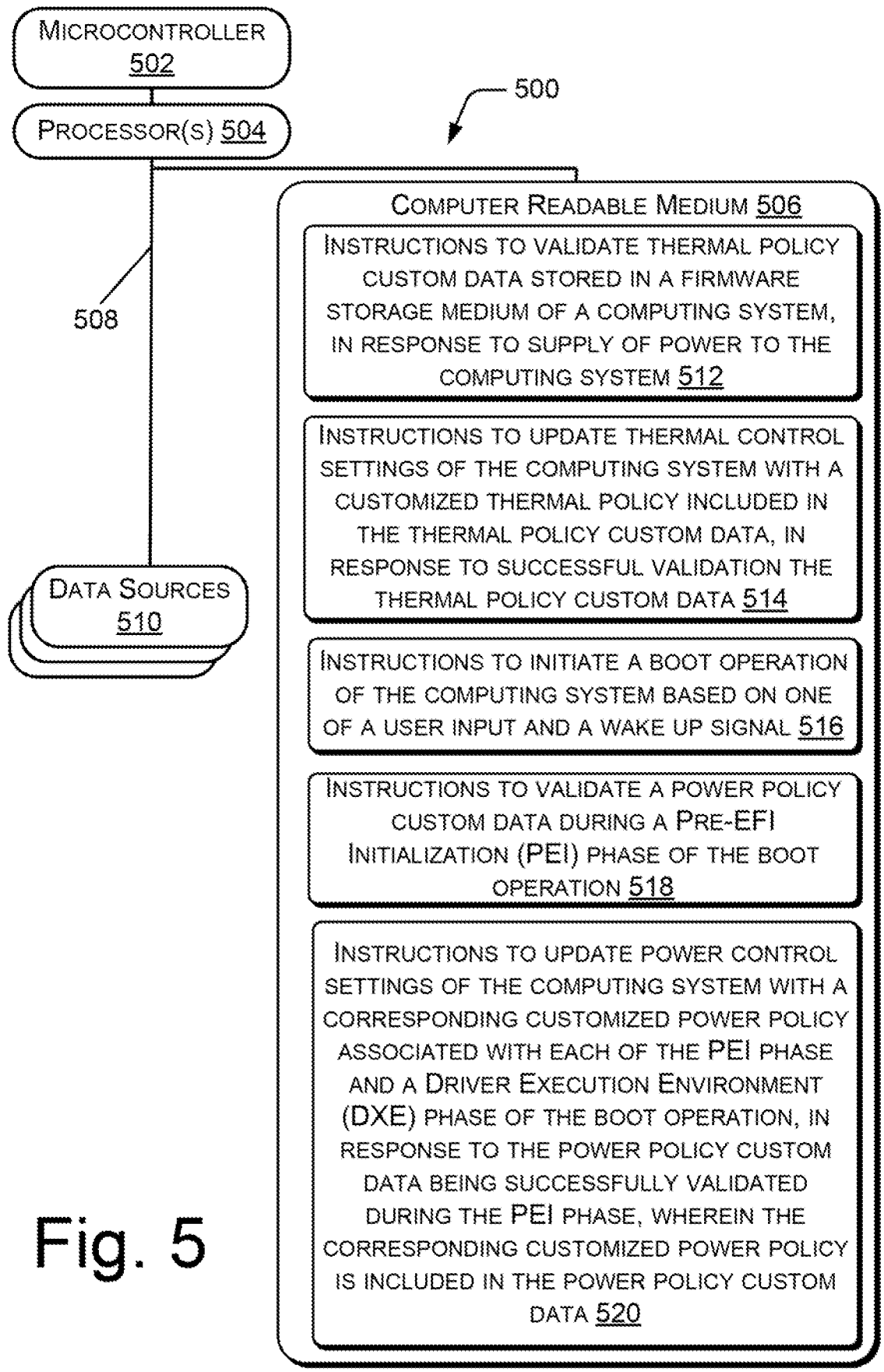
FIG. 5 illustrates a system environment implementing a non-transitory computer readable medium for customization of thermal and power policies, in accordance with an example.

FIG. 5 illustrates a system environment 500 implementing a non-transitory computer readable medium for customization of thermal and power policies, in accordance with an example.

In an example, the system environment 500 includes a microcontroller 502 and processor(s) 504 communicatively coupled to a non-transitory computer readable medium 506 through a communication link 508. In an example, the system environment 500 may be a computing system, such as the computing system 100 or 200. In an example, the microcontroller 502 and processor(s) 504 may have processing resources for fetching and executing computer-readable instructions from the non-transitory computer readable medium 506.

The non-transitory computer readable medium 506 can be, for example, an internal memory device or an external memory device. In an example implementation, the communication link 508 may be a direct communication link, such as any memory read/write interface.

The microcontroller 502, the processor(s) 504, and the non-transitory computer readable medium 506 may also be communicatively coupled to data sources 510 over the network (not shown). The data sources 510 can include, for example, memory of the system, such as the system 100 and a firmware storage medium, such as the firmware storage medium 108.

In an example, the non-transitory computer readable medium 506 includes a set of computer readable instructions which can be accessed by the microcontroller 502 and the processor(s) 504 through the communication link 508 and subsequently executed to perform acts for customization of thermal and power policies in a computing system, such as the computing system 100 or 200.

Referring to FIG. 5, in an example, the non-transitory computer readable medium 506 includes instructions 512 that cause the microcontroller 502 to validate thermal policy custom data stored in a firmware storage medium, such as the firmware storage medium 108, of the computing system, such as the system 100 or 200, in response to a supply of power to the computing system. In an example, the instructions 512 upon execution cause the microcontroller 502 to search for the thermal policy custom data in a predefined memory location of the firmware storage medium. Execution of the instructions further cause the microcontroller 502 to authenticate the thermal policy custom data stored in the predefined memory location based on a digital signature and verify compatibility of the thermal policy custom data with a motherboard circuit and Input Output System (IOS) firmware of the computing system, such as the computing system 100 or 200, in response to successful authentication of the thermal policy custom data.

In response to successful validation the thermal policy custom data, the non-transitory computer readable medium 506 includes instructions 514 that cause the microcontroller 502 to update thermal control settings of the computing system with a customized thermal policy included in the thermal policy custom data.

In addition, the non-transitory computer readable medium 506 includes instructions 516 which upon execution, cause the processor(s) 504 to initiate a boot operation of the computing system based on one of a user input and a wake up signal. In an example, the user input includes actuation of a power button of the computing system and the wake-up signal is a wake-up on LAN message received from a remote device.

Further, the non-transitory computer readable medium 506 includes instructions 518 which upon execution, cause the processor(s) 504 to validate a power policy custom data during a Pre-EFI Initialization (PEI) phase of the boot operation. In response to successful validation of the power policy custom data during the PEI phase, the non-transitory computer readable medium 506 includes instructions 520 which upon execution, cause the processor(s) 504 to update power control settings of the computing system with a corresponding customized power policy associated with each of the PEI phase and a Driver Execution Environment (DXE) phase of the boot operation. In an example, the corresponding customized power policy is included in the power policy custom data.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method for customizing thermal and power policy in a computing system, the method comprising:

validating, by a microcontroller of the computing system, thermal policy custom data stored in a firmware storage medium of the computing system, in response to a supply of power to the computing system;

updating, by the microcontroller, thermal control settings of the computing system with a customized thermal policy included in the thermal policy custom data, in response to a successful validation of the thermal policy custom data;

validating, by a processor of the computing system, power policy custom data stored in the firmware storage medium, in response to initiation of a boot operation of the computer system; and updating, by the processor, power control settings of the computing system with a customized power policy included in the power policy custom data, in response to a successful validation of the power policy custom data during the boot operation.

2. The method as claimed in claim 1, wherein validation of the thermal policy custom data by the microcontroller comprises:

searching for the thermal policy custom data in a predefined memory location of the firmware storage medium;

authenticating the thermal policy custom data stored in the predefined memory location based on a digital signature; and verifying compatibility of the thermal policy custom data with a motherboard circuit and Input Output System (IOS) firmware of the computing system, in response to successful authentication of the thermal policy custom data.

3. The method as claimed in claim 1, wherein updating the thermal control settings comprises:

loading a customized fan curve for operation of a fan to control the temperature of an internal component of the computing system, wherein the customized fan curve is indicative of a thermal control table specifying predefined fan speeds for specific temperature ranges of the internal component.

4. The method as claimed in claim 1, wherein the power policy custom data is validated by the processor during a Pre-Extensible Firmware Interface (EFI) Initialization (PEI) phase of the boot operation.

5. The method as claimed in claim 4, further comprising:

allocating, by the processor, a predefined sector of a memory of the computing system for storing the power policy custom data, in response to successful validation of the power policy custom data during the PEI phase; and creating, by the processor, a copy of the power policy custom data to be stored in the predefined sector of the memory.

6. The method as claimed in claim 5, wherein updating the power control settings comprises:

loading configuration information in the processor, a chipset, and the microcontroller for operation of a power control circuit of the computing system based on a customized power policy associated with the PEI phase, in response to successful validation of the power policy custom data during the PEI phase; and initiating a Driver Execution Environment (DXE) phase of the boot operation, in response to completion of the PEI phase;

verifying whether the power policy custom data is present in the predefined sector of the memory; and loading configuration information in the processor, the chipset, and the microcontroller for operation of the power control circuit based on a customized power policy associated with the DXE phase, in response to successful verification of the presence of the power policy custom data in the predefined sector of the memory.

7. The method as claimed in claim 1, further comprises:

loading a default thermal policy, in response to a failure in validation of the thermal policy custom data by the microcontroller; and loading a default power policy associated with an initialization phase of the boot operation, in response to a failure in validation of the power policy custom data during the boot operation.

8. The method as claimed in claim 1, further comprising:

receiving the thermal policy custom data and the power policy custom data from a server device, in response to a user request for updating the thermal and power policy;

authenticating the received thermal policy custom data and the power policy custom data based on predefined digital signatures; and allocating a corresponding predefined memory location of the firmware storage medium for storing the thermal policy custom data and the power policy custom data, in response to successful authentication of the thermal policy custom data and the power policy custom data.

9. A computing system comprising:

a microcontroller to:
  validate thermal policy custom data stored in a firmware storage medium of the computing system, in response to a supply of power to the computing system; and
  update thermal control settings of the computing system with a customized thermal policy included in the thermal policy custom data, in response to successful validation of the thermal policy custom data;

a processor coupled to the microcontroller; and a memory coupled to the processor, the memory storing instructions executable by the processor to:
  initiate a boot operation of the computing system based on one of a user input and a wake up signal;
  validate power policy custom data stored in the firmware storage medium, during a first initialization phase of the boot operation; and
  update power control settings of the computing system with a corresponding customized power policy associated with each of the first initialization phase and a second initialization phase of the boot operation, in response to successful validation of the power policy custom data during the first initialization phase, wherein the corresponding customized power policy is included in the power policy custom data.

10. The computing system as claimed in claim 9, wherein the microcontroller is to:
  search for the thermal policy custom data in a predefined memory location of the firmware storage medium;
  authenticate the thermal policy custom data stored in the predefined location based on a digital signature; and
  verify compatibility of the thermal policy custom data with a motherboard circuit and Input Output System (IOS) firmware of the computing system, in response to successful authentication of the thermal policy custom data.

11. The computing system as claimed in claim 9, wherein the microcontroller is to load a customized fan curve for operation of a fan to control the temperature of an internal component of the computing system, wherein the customized fan curve is indicative of a thermal control table specifying predefined fan speeds for specific temperature ranges of the internal component.

12. The computing system as claimed in claim 9, wherein the processor is to:

allocate a predefined sector of the memory of the computing system for storing the power policy custom data, in response to successful validation of the power policy custom data during the first initialization phase; and create a copy of the power policy custom data to be stored in the predefined sector of the memory.

13. The computing system as claimed in claim 12, wherein the first initialization phase is a Pre-EFI Initialization (PEI) phase and the second initialization phase is a Driver Execution Environment (DXE) phase and the processor is to:

load configuration information in the processor, a chipset, and the microcontroller for operation of a power control circuit of the computing system based on a customized power policy associated with the PEI phase, in response to successful validation of the power policy custom data during the PEI phase; and initiate a DXE phase of the boot operation, in response to completion of the PEI phase;

verify whether the power policy custom data is present in the predefined sector of the memory; and load configuration information in the processor, the chipset, and the microcontroller for operation of the power control circuit based on a customized power policy associated with the DXE phase, in response to successful verification of the presence of the power policy custom data in the predefined sector of the memory.

14. A non-transitory computer-readable medium comprising computer-readable instructions that upon execution cause a microcontroller of a computing system to:

validate thermal policy custom data stored in a firmware storage medium of the computing system, in response to a supply of power to the computing system; and update thermal control settings of the computing system with a customized thermal policy included in the thermal policy custom data, in response to successful validation the thermal policy custom data;

wherein the computer-readable instructions, upon execution, cause a processor of the computing system to:
  initiate a boot operation of the computing system based on one of a user input and a wake up signal;
  validate a power policy custom data during a Pre-EFI Initialization (PEI) phase of the boot operation; and
  update power control settings of the computing system with a corresponding customized power policy associated with each of the PEI phase and a Driver Execution Environment (DXE) phase of the boot operation, in response to successful validation of the power policy custom data during the PEI phase, wherein the corresponding customized power policy is included in the power policy custom data.

15. The non-transitory computer-readable medium as claimed in claim 14, wherein the computer-readable instructions upon execution cause the microcontroller to:

search for the thermal policy custom data in a predefined memory location of the firmware storage medium;

authenticate the thermal policy custom data stored in the predefined memory location based on a digital signature; and verify compatibility of the thermal policy custom data with a motherboard circuit and Input Output System (IOS) firmware of the computing system, in response to successful authentication of the thermal policy custom data.

* * * * *